United States Patent [19]

Minh et al.

[11] Patent Number: 5,356,730
[45] Date of Patent: Oct. 18, 1994

[54] MONOLITHIC FUEL CELL HAVING IMPROVED INTERCONNECT LAYER

[75] Inventors: Nguyen Q. Minh, Fountain Valley; Timothy R. Armstrong, Palos Verdes Pen.; James J. Van Ackeren, Wilmington, all of Calif.

[73] Assignee: AlliedSignal Inc., Morris Township, Morris County, N.J.

[21] Appl. No.: 37,778

[22] Filed: Mar. 26, 1993

[51] Int. Cl.$^5$ .............................. H01M 8/12
[52] U.S. Cl. ........................ 429/32; 429/33
[58] Field of Search ................... 429/32, 33

[56] References Cited

U.S. PATENT DOCUMENTS

| | | | |
|---|---|---|---|
| 4,598,467 | 7/1986 | Isenberg et al. | 429/33 X |
| 4,749,632 | 6/1988 | Flandermeyer et al. | 429/33 X |
| 4,816,036 | 3/1989 | Kotchick | 29/623.3 |
| 4,833,045 | 5/1989 | Pollack et al. | 429/32 X |
| 4,895,576 | 1/1990 | Pal et al. | 429/32 X |
| 4,913,982 | 4/1990 | Kotchick et al. | 429/12 |
| 5,143,801 | 9/1992 | Bates | 429/33 |

*Primary Examiner*—Stephen Kalafut
*Attorney, Agent, or Firm*—Robert A. Walsh

[57] ABSTRACT

A fuel cell comprises an anode, a cathode, a solid electrolyte disposed between the anode and the cathode, and interconnect means for providing an electrical connection located adjacent to either the cathode or the anode but not adjacent to the solid electrolyte. The interconnect means includes an interconnect layer having a composition of (i) a mixture of an electrical conductor and a ceramic matrix material that is sinterable in an oxidizing atmosphere at a temperature of less than about 1500° C., (ii) a mixture of a lanthanum chromite-based ceramic and a yttrium chromite-based ceramic, or (iii) a yttrium chromite-based ceramic of the form $Y_{w-x-y}Ca_xZr_yCr_{v-z}Zn_zO_3$, where w is from about 0.9 to about 1.1, x is from about 0.1 to about 0.3, y is from about 0.001 to about 0.1, z is from about 0.1 to about 0.3, and v is from about 1 to about 1.2.

9 Claims, 1 Drawing Sheet

MONOLITHIC FUEL CELL HAVING IMPROVED INTERCONNECT LAYER

BACKGROUND OF THE INVENTION

This invention relates to fuel cells, and, more particularly, to the interconnect layer of a monolithic solid oxide fuel cell.

A fuel cell is a device in which a fuel is electrochemically reacted with an oxidant to produce a DC electrical output. A fuel cell includes an anode that defines a flow passage for the fuel, such as hydrogen or a hydrocarbon, and a cathode that defines a flow passage for the oxidant, such as air or oxygen. An electrolyte separates the anode and the cathode. In one type of fuel cell, the monolithic solid oxide fuel cell, the anode, the cathode, and the electrolyte are thin, layered corrugated structures, and the fuel cell further includes plenum conduits for the introduction and removal of the fuel and oxidant.

Such fuel cells are described in more detail in U.S. Pat. Nos. 4,816,036 and 4,913,982, whose disclosures are incorporated by reference. Briefly, in such a fuel cell the fuel flowing through the anode reacts with oxide ions to produce electrons and water, which is removed in the fuel flow stream. The oxygen reacts with the electrons on the cathode surface to form oxide ions that diffuse through the electrolyte to the anode. The electrons flow from the anode through an external circuit and thence to the cathode. The electrolyte is a nonconductor of electrons, ensuring that they must pass through the external circuit to do useful work, but permits the oxide ions to pass through from the cathode to the anode.

Each individual anode/electrolyte/cathode cell generates a relatively small voltage. To achieve higher voltages that are practically useful, the individual cells are connected together to form a battery. The monolithic solid oxide fuel cell therefore contains an additional layer, an interconnect layer, between the cathode and the anode of adjacent cells.

The interconnect layer must be electrically conducting and must be formable at temperatures comparable with those required to form the other layers. In the technology described in the '036 and '982 patents, the monolithic solid oxide fuel cell is formed by a powder process, which includes sintering of the assembled structure, preferably in an oxidizing atmosphere. The sintering temperature dictated by the sintering requirements of the anode, the cathode, and the electrolyte is typically about 1400 C.–1500 C. The interconnect layer must be sinterable at this same temperature, to a sufficiently good electrical conductivity and a relatively high density of at least about 94 percent of theoretical density, and without chemical interdiffusion with the neighboring layers.

The preferred interconnect material in the past has been magnesium-doped lanthanum chromite. However, this material is not fully satisfactory in some circumstances because it may not sinter to a sufficiently high density at the sintering temperature of the anode, the cathode, and the electrolyte. In order to sinter lanthanum chromite to high densities, firing temperatures greater than 1600 C. and an atmosphere having a low oxygen partial pressure are required. These conditions, however, are not satisfactory for other fuel cell components. At such high temperatures, diffusion and reaction between components becomes significant. Moreover, low oxygen partial pressures cause the decomposition of other materials used in the fuel cell.

There is therefore a need for an improved interconnect approach for use in monolithic solid oxide fuel cells and related types of devices. The present invention fulfills this need, and further provides related advantages.

SUMMARY OF THE INVENTION

The present invention provides an approach for improving the interconnect material of a fuel cell, and in particular a monolithic solid oxide fuel cell, and for fuel cells prepared in accordance with this approach. This approach achieves the required properties for the interconnect material, including the high density of more than 94 percent of the theoretical density, using the same sintering temperatures and conditions appropriate for the anode, the cathode, and the electrolyte. The approach of the invention is fully compatible with economical manufacturing techniques such as those discussed in the '036 and '982 patents.

In accordance with the present invention, a fuel cell includes an anode, a cathode, a solid electrolyte disposed between the anode and the cathode, and interconnect means for providing an electrical connection located adjacent to the cathode or the anode but not adjacent to the solid electrolyte. The interconnect means includes an interconnect layer having a composition that, in one form, includes a mixture of an electrical conductor that provides the required electrical conductivity and a sinterable matrix that densifies in an oxidizing atmosphere at a temperature of less than about 1500 C. In another form, the interconnect layer is formed of a mixture of a lanthanum chromite-based ceramic and a yttrium chromite-based ceramic. The interconnect layer may also be a yttrium chromite-based ceramic of the composition $Y_{w-x-y}Ca_xZr_yCr_{v-z}Zn_zO_3$, where w is from about 0.9 to about 1.1, x is from about 0.1 to about 0.3, y is from about 0.001 to about 0.1, z is from about 0.1 to about 0.3, and v is from about 1 to about 1.2.

The interconnect means may be provided as a first buffer layer having a region with a composition that is intermediate between that of the anode and that of the interconnect layer, a second buffer layer having a region with a composition that is intermediate between that of the cathode and that of the interconnect layer, and the interconnect layer disposed between the first buffer layer and the second buffer layer. The buffer layers may be either of constant composition or have a gradient composition variation between that of the interconnect layer and the respective anode or cathode layers. The buffer layers on either side of the interconnect layer permit the interconnect layer to sinter in an oxidizing atmosphere at a temperature of less than about 1500° C. In this aspect of the invention, the interconnect layer may be one of those described above, or another composition.

These approaches produce an interconnect means whose manufacture is compatible with that of the other components of the fuel cell. The resulting interconnect has a high density of more than 94 percent of the theoretical density and functions to electrically connect adjacent cells as required. Other features and advantages of the present invention will be apparent from the following more detailed description of the preferred embodiment, taken in conjunction with the accompany-

DETAILED DESCRIPTION OF THE PREFERRED EMBODIMENTS

Figure 1:
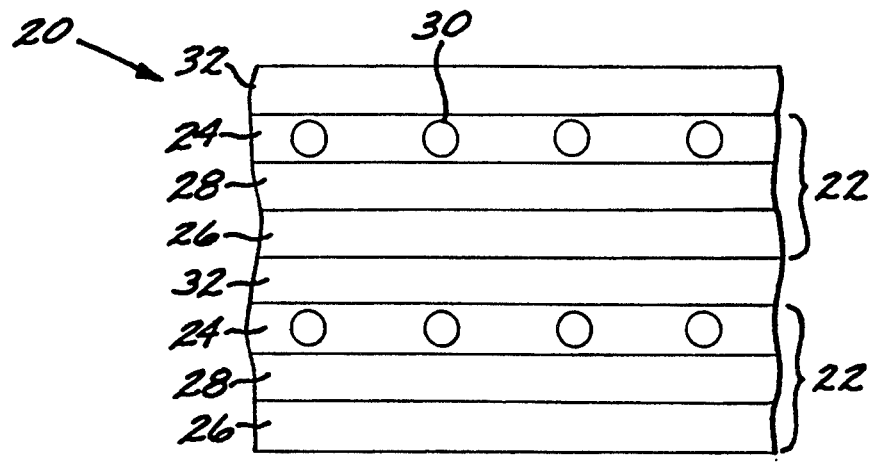
FIG. 1 is an elevational view of two adjacent electrochemical cells of a monolithic solid oxide fuel cell, connected in series through an interconnect.

FIG. 1 illustrates a fuel cell 20 having two electrochemical cells 22. Each of the electrochemical cells 22 includes two electrodes, an anode 24 and a cathode 26, with an electrolyte 28 between the anode 24 and the cathode 26. The anode 24, cathode 26, and electrolyte 28 are all in the form of layers of their respective materials of construction. Passageways 30, seen in cross section, run through the anode 24 so that the fuel for the fuel cell 20 may flow therethrough. Similar passageways pass through the cathode 26 so that the oxidant for the fuel cell 20 may flow therethrough. In the illustrated form of the fuel cell, the passageways through the cathode are at a right angle to the passageways 30, and are therefore out of view in FIG. 1. The passageways 30 connect at one end to a fuel input plenum (not shown) and at the other end to a fuel output plenum (not shown). Similarly, the passageways in the cathode connect at one end to an oxidant input plenum (not shown) and at the other end to an oxidant output plenum (not shown).

The pictured fuel cell structure is that illustrated in U.S. Pat. No. 4,913,982. Other fuel cell structures such as that shown in U.S. Pat. No. 4,816,096 may be used in the fuel cell of the present invention, as may other operable structures.

In one preferred form of the fuel cell 20, the anode 24 is a cermet of cobalt or nickel metal and yttria-stabilized zirconia. The cathode 26 is strontium-doped lanthanum manganite. The electrolyte 28 is yttria-stabilized zirconia. Other operable materials of construction may be used.

An interconnect layer 32 is placed between the two electrochemical cells 22 to connect them in series. In the conventional approach, the interconnect layer 32 is a single layer made of magnesium-doped, strontium-doped, or calcium, cobalt-doped lanthanum chromite. The present invention provides an improved construction and material composition and a fuel cell utilizing these improvements.

A powder processing approach for preparing the fuel cell 20 is presented in the '982 patent, and that same approach is operable with the present invention. Briefly, a mixture of the appropriate powdered materials with a binder and a plasticizer is prepared in a high-intensity mixer, for each of the layers 24, 26, 28, and 32. Each of the mixtures is rolled between rollers into a tape. In one embodiment of this approach, threads are incorporated into the anode tape and cathode tape to define the passageways 30. The tapes are laminated together with other structure to form the fuel cell. The array is heated to an intermediate temperature to extract the binder and plasticizer from each tape, and to burn out the threads from the anode and cathode tapes. The array is further heated to a higher temperature to sinter the powders in each tape together and sinter the tapes and other structure together to form the monolithic solid oxide fuel cell. In another embodiment, the anode and cathode tapes are corrugated or embossed to provide the gas passageways. The tapes are bonded in proper sequence and orientation to produce a green ceramic structure. The structure is fired to form the monolithic solid oxide fuel cell.

The selection of the sintering temperature, time, and heating and cooling rates requires a careful balancing of the need to achieve a structure wherein each layer is sufficiently densified to perform its function, and at the same time avoiding excessive loss of material through volatilization and excessive interdiffusion of the layers. The optimal sintering temperature for the anode, cathode, and electrolyte materials is in the range of about 1400 C.–1500 C. At this temperature, however, the conventional doped lanthanum chromite interconnect may not achieve a sufficiently high density to prevent gas leakage between adjacent cells. To achieve such a high density in that material, it is necessary to sinter at a temperature above 1600 C. But, at these higher sintering temperatures, there may be volatilization and migration of the cathode material and interdiffusion of the electrode materials and the interconnect. The chromium oxide of the interconnect itself can be volatile at the higher sintering temperature, causing a change in composition during sintering.

In one aspect of the invention, the interconnect layer 32 is made of a mixture of an electrical conductor and a sinterable matrix that densifies in an oxidizing atmosphere at a temperature of less than about 1500 C. In this approach, the interconnect layer 32 achieves sufficient electrical conductivity for its purpose due to the presence of the electrical conductor, which may be a metal (making the interconnect layer 32 a cermet) such as a noble metal (e.g., platinum, palladium) or a ceramic such as a doped lanthanum chromite, a doped yttrium chromite, or a cobalt chromite. The selected electrical conductor must be electrically conductive, stable during sintering, stable in both the fuel and oxidant environments, chemically compatible with the anode and cathode materials, and chemically compatible with the sinterable matrix.

The other component of the interconnect layer 32 is a sinterable matrix. The matrix is not required to be electrically conductive, but it must be stable during sintering, stable in both the fuel and oxidant environments, chemically compatible with the anode and cathode materials, and chemically compatible with the electrical conductor. The matrix readily sinters at the sintering temperature of the fuel cell, preferably at 1500° C. or lower temperature, and acts as a support that holds the electrically conductive phase together. Possible matrix materials include zirconia, ceria, glasses, glass ceramics, and spinels. Thus, the final structure of the interconnect layer 32 is a composite of an electrically conductive phase and a matrix binding phase.

The electrical conductor phase must have a volume fraction in the mixture sufficient for the interconnect layer 32 to exhibit bulk electrical conductivity. The precise volume fraction required will depend upon the sizes and morphologies of the powders used to manufacture the interconnect layer, but generally the volume fraction of the electrical conductor phase should be at least about 30 percent of the total volume of the interconnect layer 32.

In a variation of the composite interconnect approach, it has been found that a mixture of a doped lanthanum chromite-based ceramic and a mixture of a doped yttrium chromite-based ceramic can be sintered at a temperature of from about 1350° C. to about 1500° C. in air to provide the required interconnect structure. This sintered structure has both sufficient electrical conductivity and sufficient density, and has the required compatibility with the fuel, oxidant, and other phases, as discussed above.

In this approach, yttrium chromite of formula $Y_{l-x-y}Ca_xZr_yCr_{v-z}Zn_zO_3$ or $Y_{l-x'}Ca_{x'}CrO_3$ was mixed with lanthanum chromite of formula $La_{l-x''}Ca_{x''}Cr_{l-y''}Co_{y''}O_3$. In these formulations, x is from about 0.1 to about 0.3, y is from about 0.001 to about 0.1, z is from about 0.1 to about 0.3, and v is from about 1 to about 1.2; x' is from about 0.1 to about 0.3; and x" is from about 0.1 to about 0.3, and y" is from about 0.1 to about 0.3.

The values of x, y, z, x', x", and y" are selected to provide desired sinterability and electrical conductivity for the interconnect layer. For example, x, x', x", and y" should be in the range of about 0.1 to about 0.3 to yield adequate electrical conductivity. Values more than about 0.3 tend to either decrease the electrical conductivity or form undesirable second phases. The values of y and z are chosen to enhance the sinterability. If y or z is zero (i.e., zirconium or zinc is left out), the as-sintered density of the interconnect falls significantly. Higher values tend to result in the formation of second phases. The value of v is in the range of from about 1 to about 1.2 to provide chromium nonstoichiometry in the material to improve sinterability.

A number of specimens were prepared to verify this approach and determine the optimum mixture of the modified yttrium chromite and the modified lanthanum chromite. In performing these studies, the stoichiometric values the variables were as follows: x=0.15; y=0.008, v=1; z=0.1; x'=0.2; x"=0.2, y"=0.1. The specimens were prepared by ball milling the mixture of two powders and screened through a 100 mesh screen. Mixtures having 25% by weight, 50% by weight, and 75% by weight of the modified yttrium chromite, balance modified lanthanum chromite, were prepared. Bulk specimens were prepared by pressing. The samples were sintered at a temperature of 1400 C.

After sintering, the densities of the samples were measured. The highest densities were obtained with those samples having 25% modified yttrium chromite, balance modified lanthanum chromite.

In a further aspect of the invention, it has been found that the modified yttrium chromite may be used by itself in the interconnect layer 32, with a slightly higher sintering temperature than for the mixture of modified yttrium chromite and modified lanthanum chromite, as just described. Thus, the interconnect may be made of modified yttrium chromite of the form $Y_{w-x-y}Ca_xZr_y Cr_{v-z}Zn_zO_3$, where w is from about 0.9 to about 1.1, x is from about 0.1 to about 0.3, y is from about 0.001 to about 0.1, z is from about 0.1 to about 0.3, and v is from about 1 to about 1.2. This material may be sintered to 90% of theoretical density at a sintering temperature of 1500 C. in about 1 hour.

As described above, the preferred values of w, x, y, v, and z were selected to improve the conductivity and sinterability of the yttrium chromite. Higher values than indicated tend to lead to the formation of second phases, and lower values tend to result in degradation of electrical conductivity or sinterability. For example, a material with w=1, x=0.15, y=0.008, v=1, and z=0.1 was found to densify when sintered at 1500° C. for 1 hour. The material of the same formulation, except that y=0, showed only slight densification.

Figure 2:
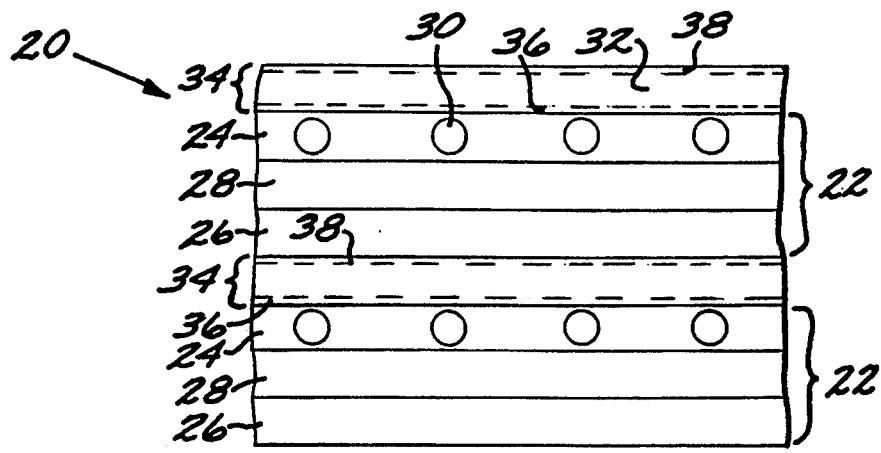
FIG. 2 is an elevational view similar to that of FIG. 1, except that the interconnect has an internally layered structure.

In yet another aspect of the invention, illustrated in FIG. 2, an interconnect means 34 has sublayers produced during the manufacturing operation. The interconnect means 34 includes a first buffer layer 36 having a region with a composition that is intermediate between that of the anode 24 and that of the interconnect layer 32. There is further a second buffer layer 38 having a region with a composition that is intermediate between that of the cathode 26 and that of the interconnect layer 32. The interconnect layer 32 is thus disposed between the first buffer layer 36 and the second buffer layer 38.

When interconnect layers of the modified lanthanum chromite type are sintered at temperatures above 1500° C., as may be required, there is the possibility that the material of the anode 24 may interdiffuse with that of the interconnect layer on one side of the interconnect layer, and that the material of the cathode 26 may interdiffuse with that of the interconnect layer 32 on the other side of the interconnect layer. If, on the other hand, sintering aids are added to the lanthanum chromite to lower its sintering temperature, ions from the sintering aids may diffuse into the anode and/or the cathode, causing changes that can degrade their performance.

In the approach of FIG. 2, the buffer layers 36 and 38 are placed on either side of the electrical interconnect layer 32, to form the interconnect means. The buffer layer 36 has a composition that is intermediate between that of the interconnect layer 32 and that of the anode 24. The buffer layer 38 has a composition that is intermediate between that of the interconnect layer 32 and that of the cathode. Such compositions introduce no new elements into the structure which might interfere with the functioning of either the interconnect layer or the anode or cathode. The two buffer layers sinter at a temperature less than that of the interconnect layer 32, and therefore before the interconnect layer during the sintering operation, forming a denser barrier on either side of the interconnect layer during its sintering. The barrier prevents interdiffusion of species between the interconnect layer and the layers on either side during sintering of the interconnect layer, and reduces volatilization of the elements in the interconnect layer by effectively sealing the surface of the interconnect layer during sintering. The smaller compositional differences faced by the layers also reduce the interdiffusional driving forces.

The buffer layers 36 and 38 may each be of a single composition, may have several compositions through the thickness of the layer, or may have a graded composition with a smoothly varying composition. Each of these structures may be made prepared with the tape casting technology described in the '036 and '982 patents. For example, the buffer layer 36 could be of a single composition of some intermediate value between the interconnect layer and the anode, such as 50 percent interconnect material and 50 percent anode material. It could instead have individual sublayers, such as a sublayer with 25 percent anode material and 75 percent interconnect material adjacent to the interconnect layer, a sublayer with 75 percent anode material and 25 percent interconnect material adjacent to the anode layer, and an intermediate sublayer with 50 percent anode material and 50 percent interconnect material between the other two sublayers. Yet another possibility is a smoothly varying composition between interconnect material adjacent to the interconnect layer and anode material adjacent to the anode layer. The second buffer layer can have similar types of structures, except formed of mixtures of interconnect layer material and cathode layer material.

Although particular embodiments of the invention have been described in detail for purposes of illustration, various modifications may be made without departing from the spirit and scope of the invention. Accordingly, the invention is not to be limited except as by the appended claims.

What is claimed is:

1. A fuel cell, comprising:
   a pair of electrodes, including
   an anode, and
   a cathode;
   a solid electrolyte disposed between the anode and the cathode; and
   interconnect means for providing an electrical connection located adjacent to one of the electrodes but not adjacent to the solid electrolyte, the interconnect means including an interconnect layer having a composition selected from the group of electrically conducting materials consisting of
   (i) a mixture of an electrical conductor and a matrix material that is sinterable in an oxidizing atmosphere at a temperature of less than about 1500 C.,
   (ii) a mixture of a lanthanum chromite-based ceramic and a yttrium chromite-based ceramic, and
   (iii) a yttrium chromite-based ceramic of the form $Y_{w-x-y}Ca_xZr_yCr_{v-z}Zn_zO_3$, where w is from about 0.9 to about 1.1, x is from about 0.1 to about 0.3, y is from about 0.001 to about 0.1, z is from about 0.1 to about 0.3, and v is from about 1 to about 1.2.

2. The fuel cell of claim 1, wherein the interconnect means includes,
   a first buffer layer having a region with a composition that is intermediate between that of the anode and that of the interconnect layer,
   a second buffer layer having a region with a composition that is intermediate between that of the cathode and that of the interconnect layer, and
   the interconnect layer disposed between the first buffer layer and the second buffer layer.

3. The fuel cell of claim 1, wherein the anode, the cathode, the electrolyte, and the interconnect means all have a flat layered morphology.

4. The fuel cell of claim 1, wherein the electrical conductor is selected from the group consisting of a noble metal, doped lanthanum chromite, a yttrium chromite-based ceramic, and cobalt chromite.

5. The fuel cell of claim 1, wherein the matrix material is selected from the group consisting of zirconium oxide, cerium oxide, a glass, a glass ceramic, and a spinel.

6. A fuel cell, comprising:
   a pair of electrodes, including
   an anode layer, and
   a cathode layer;
   a solid electrolyte layer disposed between the anode layer and the cathode layer; and
   interconnect means for providing an electrical connection located adjacent to one of the electrodes but not adjacent to the solid electrolyte, the interconnect means including an interconnect layer comprising a mixture of a lanthanum chromite-based ceramic and a yttrium chromite-based ceramic.

7. The fuel cell of claim 6, wherein the interconnect means includes,
   a first buffer layer having a region with a composition that is intermediate between that of the anode and that of the interconnect layer,
   a second buffer layer having a region with a composition that is intermediate between that of the cathode and that of the interconnect layer, and
   the interconnect layer disposed between the first buffer layer and the second buffer layer.

8. A fuel cell, comprising:
   a pair of electrodes, including
   an anode layer, and
   a cathode layer;
   a solid electrolyte layer disposed between the anode layer and the cathode layer; and
   interconnect means for providing an electrical connection located adjacent to one of the electrodes but not adjacent to the solid electrolyte, the interconnect means including an interconnect layer comprising a yttrium chromite-based ceramic of the form $Y_{w-x-y}Ca_xZr_yCr_{v-z}Zn_zO_3$, where w is from about 0.9 to about 1.1, x is from about 0.1 to about 0.3, y is from about 0.001 to about 0.1, z is from about 0.1 to about 0.3, and v is from about 1 to about 1.2.

9. The fuel cell of claim 8, wherein the interconnect means includes,
   a first buffer layer having a region with a composition that is intermediate between that of the anode and that of the interconnect layer,
   a second buffer layer having a region with a composition that is intermediate between that of the cathode and that of the interconnect layer, and
   the interconnect layer disposed between the first buffer layer and the second buffer layer.

* * * * *